Figure 1:
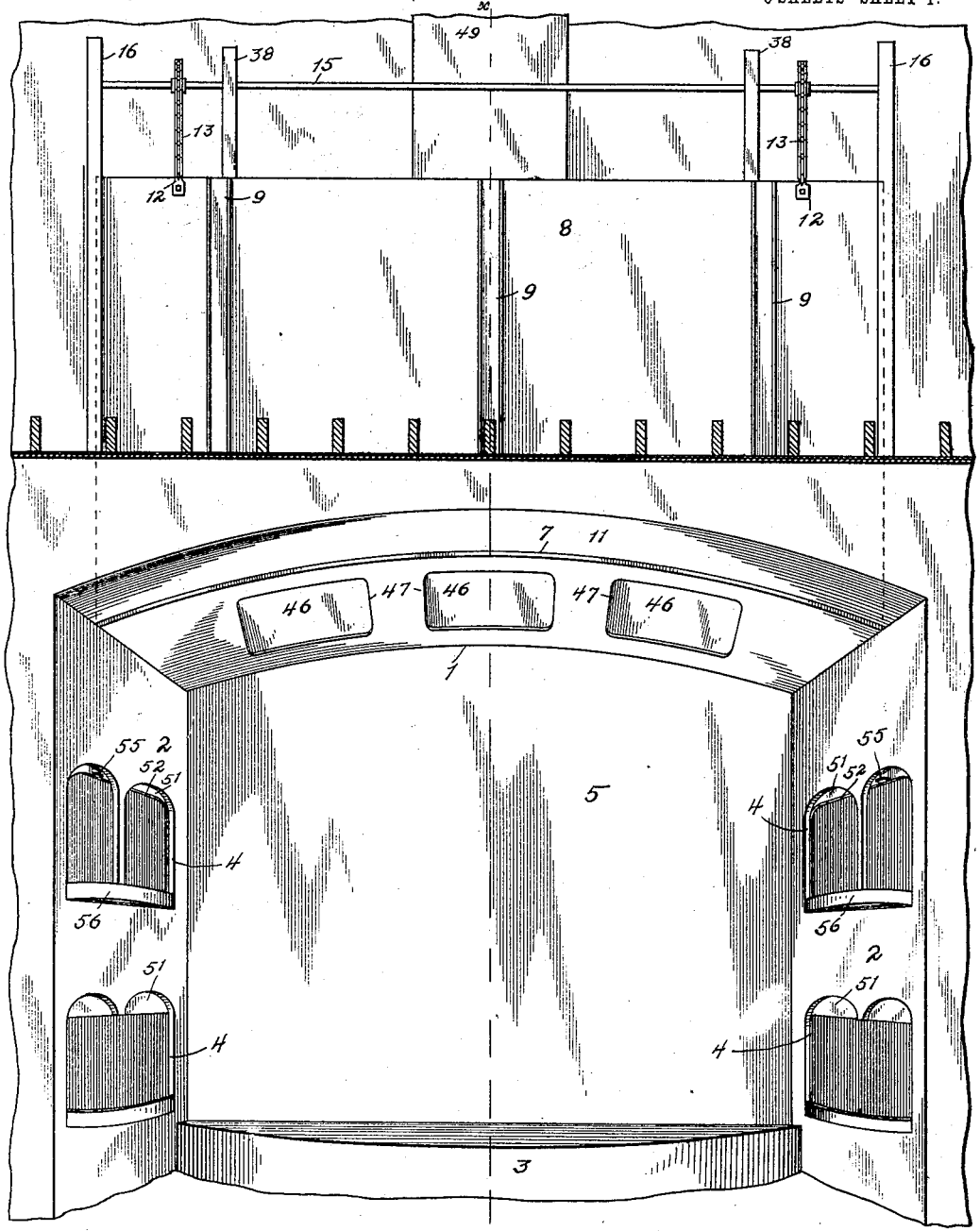

No. 773,228. PATENTED OCT. 25, 1904.
G. ROLKE.
PROSCENIUM ARCH.
APPLICATION FILED APR. 20, 1904.
NO MODEL. 5 SHEETS—SHEET 2.

WITNESSES:
A. L. Phelps
M. B. Schley

INVENTOR
Gustav Rolke.
BY
Shepherd & Parker
ATTORNEYS.

No. 773,228. PATENTED OCT. 25, 1904.
G. ROLKE.
PROSCENIUM ARCH.
APPLICATION FILED APR. 20, 1904.
NO MODEL. 5 SHEETS—SHEET 3.

WITNESSES: INVENTOR
Gustav Rolke.
BY
ATTORNEYS

No. 773,228. PATENTED OCT. 25, 1904.
G. ROLKE.
PROSCENIUM ARCH.
APPLICATION FILED APR. 20, 1904.
NO MODEL. 5 SHEETS—SHEET 4.

WITNESSES:
A. L. Phelps

INVENTOR
Gustav Rolke.
BY
Shepherd & Parker
ATTORNEYS

No. 773,228. PATENTED OCT. 25, 1904.
G. ROLKE.
PROSCENIUM ARCH.
APPLICATION FILED APR. 20, 1904.
NO MODEL. 5 SHEETS—SHEET 5.

WITNESSES:
A. L. Phelps

INVENTOR
Gustav Rolke
BY
Shepherd & Parker
ATTORNEYS.

No. 773,228. Patented October 25, 1904.

UNITED STATES PATENT OFFICE.

GUSTAV ROLKE, OF COLUMBUS, OHIO.

PROSCENIUM-ARCH.

SPECIFICATION forming part of Letters Patent No. 773,228, dated October 25, 1904.

Application filed April 20, 1904. Serial No. 204,028. (No model.)

*To all whom it may concern:*

Be it known that I, GUSTAV ROLKE, a citizen of the United States, residing at Columbus, in the county of Franklin and State of Ohio, have invented a certain new and useful Improvement in Proscenium-Arches, of which the following is a specification.

My invention relates to an improvement in proscenium-arches.

The object of the invention is to provide means for conducting and controlling a fire upon the stage of a theater, such means being so arranged as to prevent the spreading of the fire into the auditorium and at the same time drawing off the injurious gases and fumes.

Another object of the invention lies in a water-spraying device operated by the conducting apparatus, whereby the various parts are cooled, and thus preventing the same from warping and becoming inoperative through the action of the extreme heat.

Finally the object of the invention is to provide a device of the nature set forth that will be strong, durable, and efficient in its purposes and one which will be simple of operation and whose parts will not be liable to get out of working order.

With the above and other objects in view the invention consists of the novel details of construction and operation, a preferable embodiment of which is described in the specification, and illustrated in the drawings, wherein—

Figure 2:
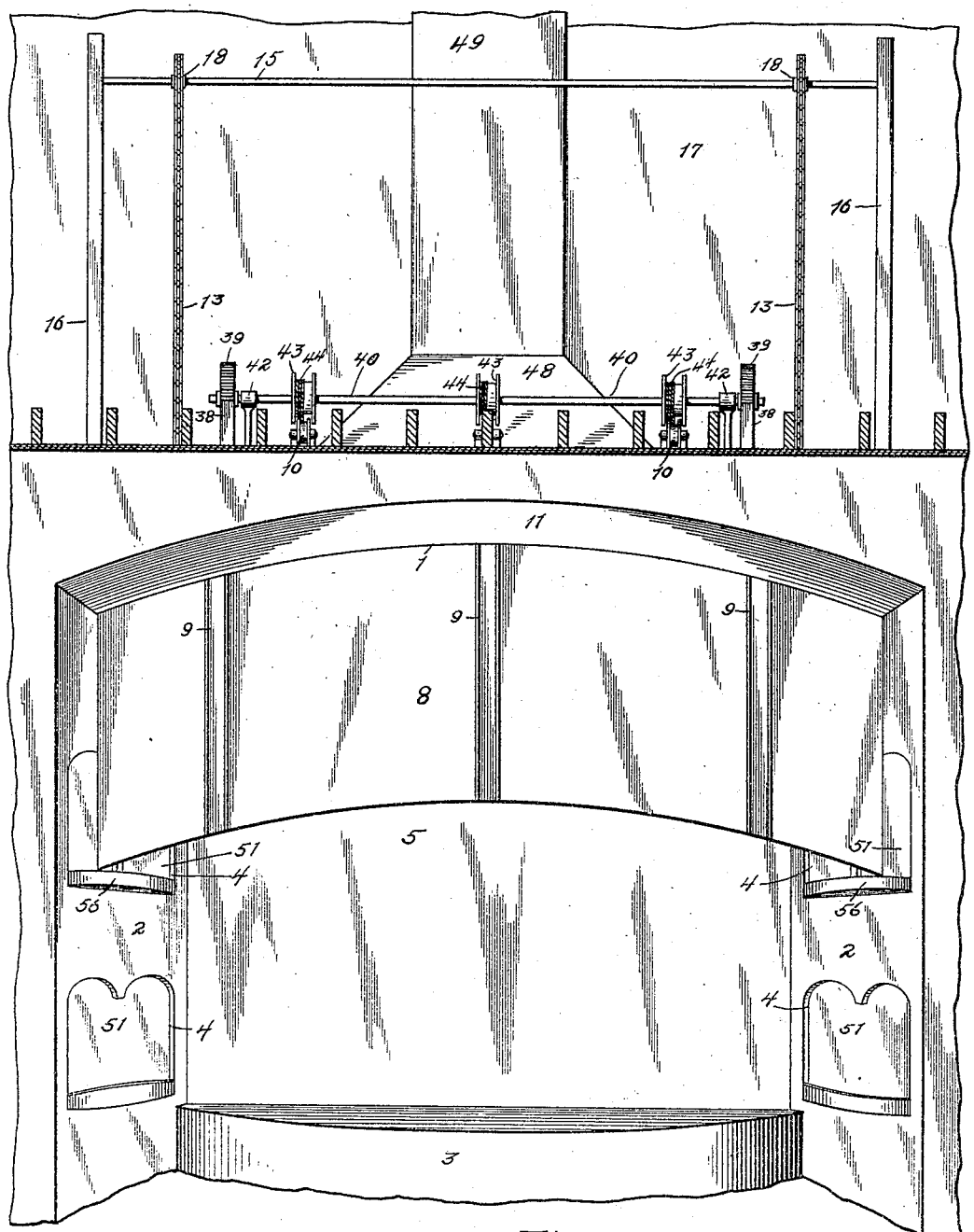
Figure 3:
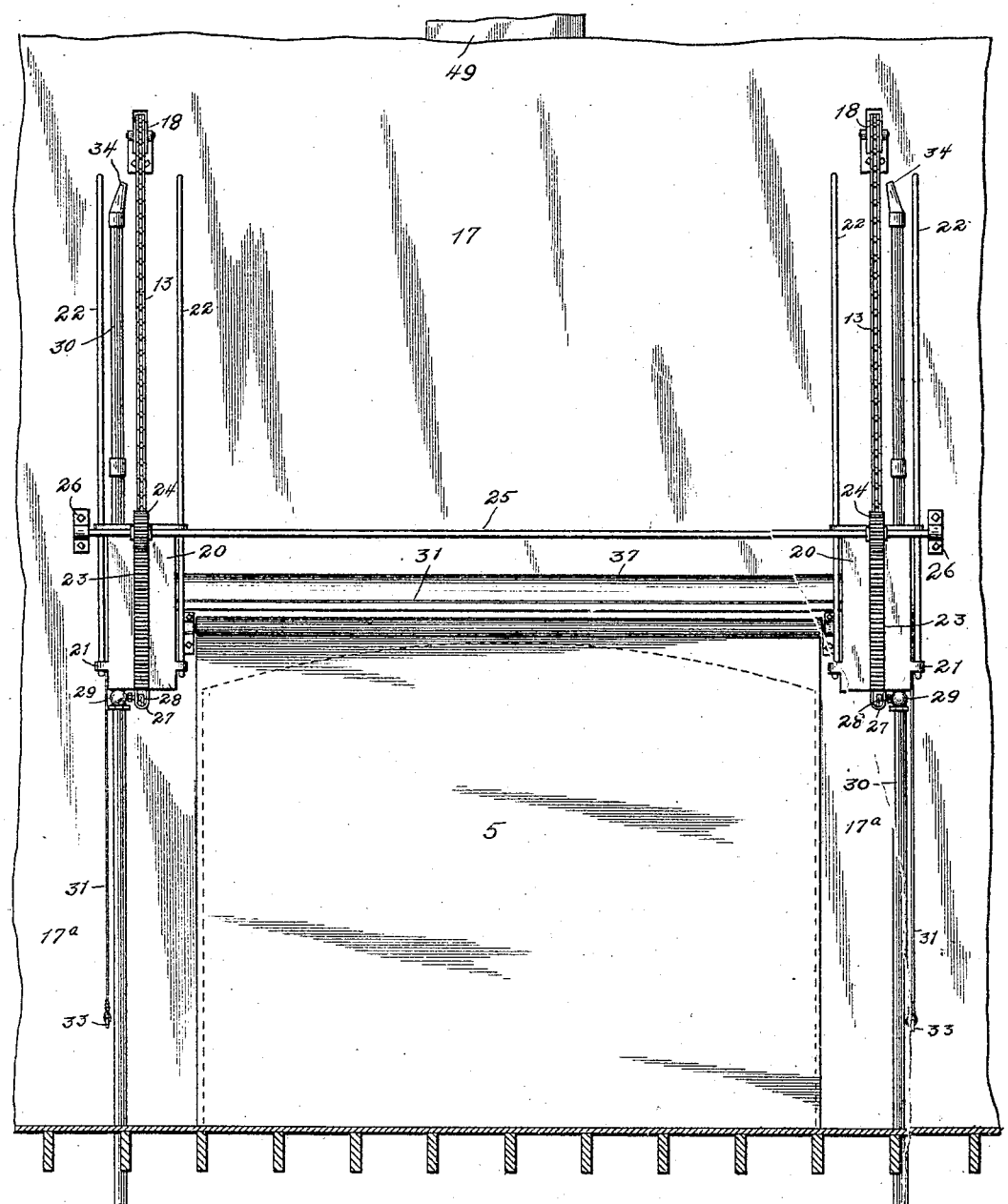
Figures 4, 5, 6:
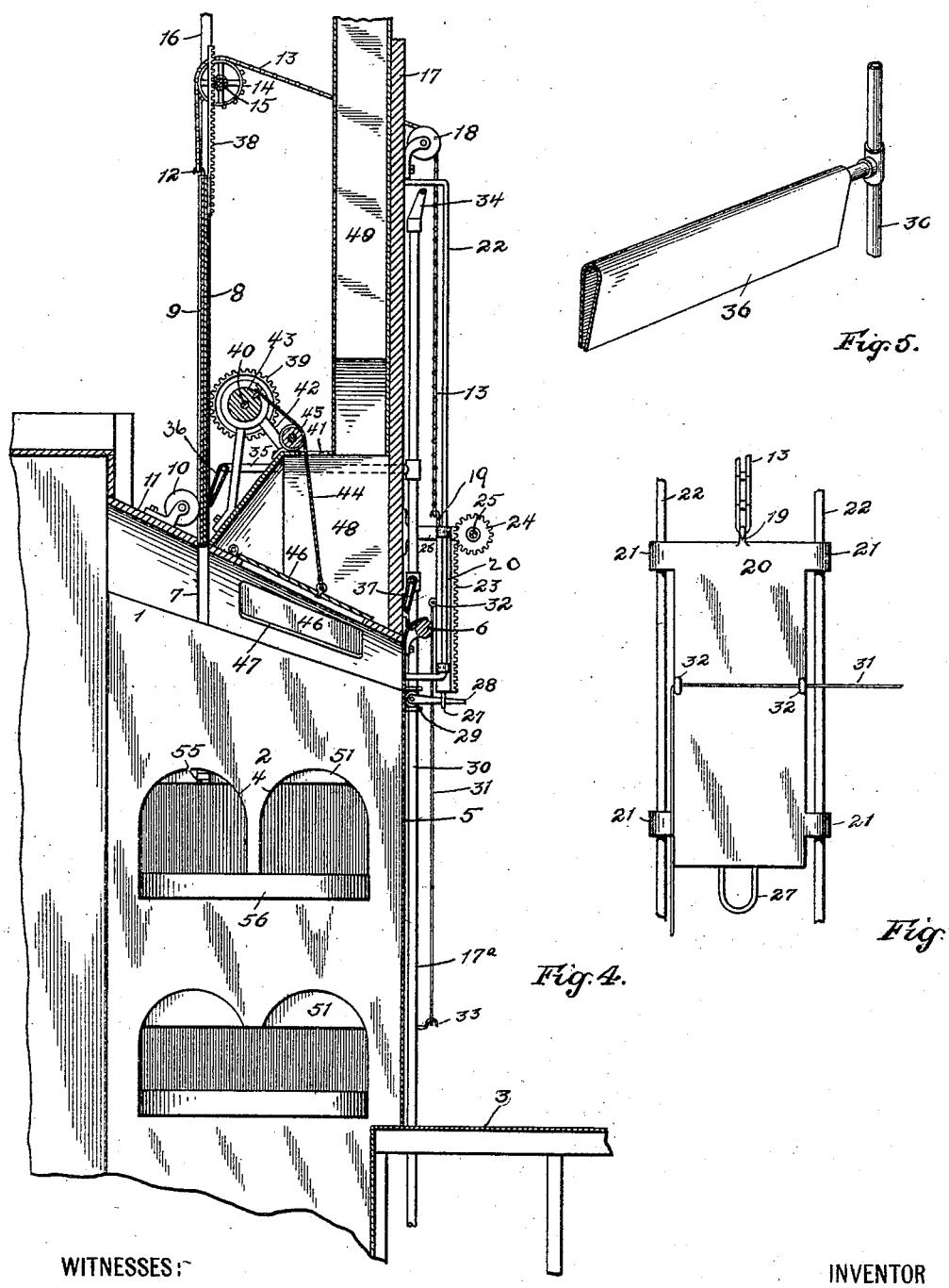
Figure 7:
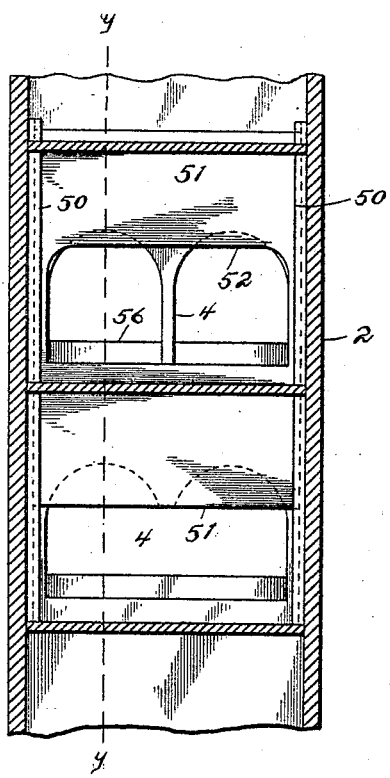
Figure 8:
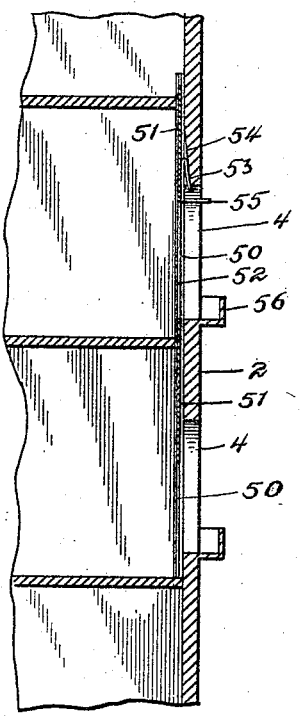
Figure 9:
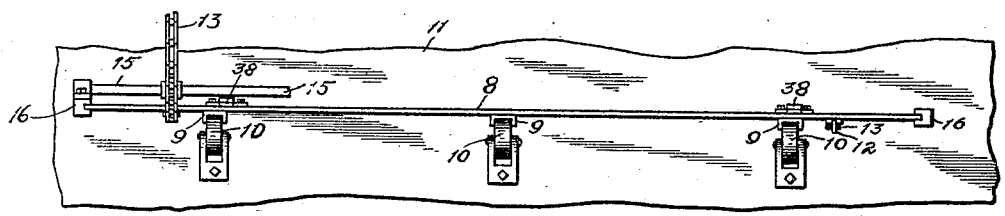

Figure 1 is a front elevation of the proscenium-arch, showing the ceiling in section and illustrating the fire-shield and the box-shields in their raised positions. Fig. 2 is a similar view showing the fire-shield and the box-shields in their lowered positions. Fig. 3 is a rear elevation looking from the stage. Fig. 4 is a vertical sectional view taken on the line $x\ x$ of Fig. 1. Fig. 5 is a detailed perspective view of one of the sprayer-heads. Fig. 6 is a detailed elevation of one of the controlling-weights. Fig. 7 is a vertical sectional view of one of the box-tiers, showing in rear elevation one of the box-shields in its raised position. Fig. 8 is a vertical sectional view taken on the line $y\ y$ of Fig. 7; and Fig. 9 is a top plan view of the fire-shield and its guiding-rollers, showing a portion of the elevating mechanism.

In the drawings the numeral 1 designates the proscenium-arch, having on either side the usual box-tiers 2, between which projects the forward part of the stage 3. The box-tiers are provided with the usual arched openings 4. At the rear of the proscenium-arch is arranged the asbestos curtain 5, mounted upon the roller 6 and suitably operated by any suitable means. The arch 1 near its forward end is formed with a longitudinal opening 7, through which the fire-shield 8 is raised and lowered, which latter has its lower end curved to conform to the contour of the arch, so that it may stand within the opening, completely filling the same and without marring the appearance of the surface thereof. The shield 8 is provided on its forward face with vertical channel-irons 9, in which bear guide-rollers 10, secured upon the roof 11 of the arch. Secured along the upper edge of the shield 8 are a plurality of hooks 12, which are engaged with the ends of link chains 13, which latter pass over guide-sprockets 14, mounted on a longitudinal shaft 15, supported at its ends by vertical standards 16. The chains 13 pass rearwardly through the partition 17 and over idle spools 18, mounted on the partition 17. The depending ends of the chains 13 are engaged with hooks 19 on the upper ends of a pair of sliding weights 20, provided with laterally-projecting lugs 21, through which pass the fixed guide-rods 22, thus retaining the weights in vertical alinement as they are moved up and down. The weights 20 are formed on their central rear faces with vertical racks 23, which mesh with pinions 24, fixed on a longitudinal shaft 25, which latter is supported from the partition 17 by brackets 26. It will be seen that by so connecting the weights they will move in unison and the shield will be lowered equally from each side at the start of its descent. Loops 27, projecting from the lower ends of the weights 20, normally engage the arms 28 of the water-cocks 29 of the sprinkling-pipes 30. The weights 20 are retained in their normal position, as shown in Figs. 3 and 4, by means of a fusible cord 31, which passes through eyes 32, carried upon the weights and engaged at its ends over hooks 33, fastened to the stage-wall 17ª. The hooks are arranged at such a height from the stage 3 as to be within the reach of a person, so that should it be desired to lower the shield 8 before the cord 31 has fused the same might be readily accomplished by removing the cord from the hooks or severing the same.

In connection with the shield 8 and its operating mechanism I employ means for spraying water, comprising the vertical water-pipes hereinbefore described, which carry at their upper ends nozzles 34, from which water is ejected into the flies. Extending forwardly from the pipes 30 and through the partition 17 are branch pipes 35, which terminate in juxtaposition to the rear of the shield 8. Supported between the pipes 35 and bearing at its mouth against the shield is a sprinkler-head 36, which is so shaped as to cause the water to run down the shield when the same is lowered in a continuous sheet. Supported immediately over the asbestos curtain 5 and between the pipes 30 is a similar sprinkler-head 37, so positioned as to deliver the sheet of water upon the outer surface of the said curtain.

Projecting vertically from the upper end of the shield 8 are a pair of racks 38, which when the shield is lowered mesh with pinions 39, mounted on the shaft 40, suitably supported by brackets 42 upon a fire-hood 41, hereinafter described. Drums 43, keyed on the shaft 40, carry hoisting-cables 44, which are guided over idle spools 45 and fastened at their lower ends to upwardly-swinging flue-doors 46. It will thus be seen that as the shield 8 passes downward and the racks 38 engage the pinions 39 the drums 43 will be rotated, thus winding the cables 44 and raising the doors 46, which cover openings 47 in the roof of the arch. Supported over the doors 46 is a hood 48, which communicates with an upwardly-extending stack or flue 49, which latter extends through the roof of the theater.

Disposed on each side of the interior of the boxes are vertical channel-irons 50, in which slide the box-shields 51. It will be observed that the shields are located in close proximity to the inner surface of the front walls of the boxes. The shields are formed with openings 52, shaped to register with the openings 4 in the box-tiers 2. The shields are held in their raised or normal position by a spring-catch 53, which engages in a recess 54 in the wall 2. A lug 55 projects through one of the upper openings 4 beyond the wall 2 into the path of the shield 8, by which it is engaged when the same descends, and thus causing the shields 51 to be carried downward and close the openings 4 of the boxes.

From the foregoing description the operation of the device will be readily understood and is as follows: The fuse-cord 31 having been severed by the fire or manually disengaged from the hooks 33 releases the controlling-weights 20, thus allowing the fire-shield 8 to descend by the force of gravity. As the weights 20 move upward the arms 28 of the water-valves 29 are swung upward, thus opening the valves and allowing the water to spray from the sprinkler-heads 36 and 37 and the nozzles 34, as hereinbefore described. The arms 28 as they are swung upward gradually withdraw from the loops 27, thus allowing the weights 20 to continue their upward movement. The shield 8 on moving downward is guided by the rollers 10 and channel-irons 9 and engages at its lower end the projecting lugs 55 of the box-shields 50, forcing the said shields downward and covering the openings 4 of the box-tiers. At the same time the racks 38 engage with the pinions 39, which sets the drums 43 in motion, thus winding the cables 44 and raising the doors 46, which cover the openings 47 in the roof 11 of the arch. It will readily be seen that should the asbestos curtain be torn away or become inoperative, so that it could not be lowered, the fire would be drawn toward the fire-shield 8 and up through the openings 47 into the hood 48 and thence up through the flue 49 by the draft which would be created by the opening of the doors 46, and thereby be prevented from spreading into the auditorium of the theater. It is also apparent that the water spraying onto the various parts would tend to cool them, and thus maintain them in their operating condition. The fire-shield is limited in its downward movement by the balustrades 56 of the upper boxes and also by the guides 22, which limit the upward movement of the weights 20.

For the purpose of preventing the metal parts from shrinking and warping due to the excessive heat I face the box-shields 51, the upper surface of the roof 11, the rear face of the fire-shield 8, and the inner surface of the hood 48 with asbestos, which, it will readily be seen, will greatly protect the said parts and maintain them in an operative condition.

I do not wish to limit myself to the exact details of construction and operation set forth, as I may make various changes in the same without departing from the spirit of my invention.

Having now fully described my invention, what I claim, and desire to secure by Letters Patent, is—

1. In an apparatus of the type set forth, the combination with a proscenium-arch, of a fire-shield adapted to be lowered therethrough, means for holding the shield in an elevated position, weights for controlling the lowering of the shield, means for cooling the parts set to operate by the weights, a draft-flue arranged over the arch, and means operated by the shield for opening the flue.

2. In an apparatus of the type set forth, the combination with a shield and means for lowering the same, of box-shields, means for holding the shields elevated, and means carried by the shields adapted to be engaged by the lower end of the first-named shield to lower the same.

3. The combination with the roof of a proscenium-arch having openings therein, and a fire-shield adapted to descend through one of the said openings, of doors normally closing the other openings, rotary means having a winding connection with the doors for raising the same, and means carried by the shield for imparting motion to the rotary means as the shield descends.

4. In an apparatus of the type set forth, the combination with a proscenium-arch having openings in its roof, a draft conducting and controlling means arranged over some of said openings, of a descending fire-shield operating through the remaining opening, flexible means for supporting the shield, controlling-weights supported by the flexible means for counterbalancing the shield, and fusible means connected to the weights for holding the parts in their normal positions.

5. In an apparatus of the type set forth, the combination with a proscenium-arch and a fire-shield operating therein, of weights for controlling the fire-shield, flexible means for connecting the weights with the fire-shield, means for guiding the weights, means for equalizing the initiatory movement of the weights, and fusible means connected to the weights whereby the shield is held in its elevated position.

GUSTAV ROLKE.

In presence of—
C. C. SHEPHERD,
W. L. MORROW